United States Patent [19]
John et al.

[11] Patent Number: 5,995,386
[45] Date of Patent: Nov. 30, 1999

[54] CONTROL CIRCUIT ARRANGEMENT FOR LIMITING OUTPUT CURRENT IN POWER SWITCHING TRANSISTOR

[75] Inventors: Paul John, Hazlet; Walter George Kutzavitch, Freehold, both of N.J.

[73] Assignee: Lucent Technologies Inc., Murray Hill, N.J.

[21] Appl. No.: 09/055,086

[22] Filed: Apr. 3, 1998

[51] Int. Cl.$^6$ .................................................. H02M 3/335
[52] U.S. Cl. ............................................................ 363/21
[58] Field of Search .................................. 363/21, 56, 97; 323/222

[56] References Cited

U.S. PATENT DOCUMENTS

| | | | |
|---|---|---|---|
| 4,425,611 | 1/1984 | Easter | 363/21 |
| 4,712,169 | 12/1987 | Albach | 363/89 |
| 5,418,709 | 5/1995 | Lukemire . | |
| 5,459,392 | 10/1995 | Madelcorn | 323/222 |
| 5,521,807 | 5/1996 | Chen et al. . | |
| 5,528,122 | 6/1996 | Sullivan et al. . | |
| 5,596,465 | 1/1997 | Honda et al. . | |
| 5,615,097 | 3/1997 | Cross . | |
| 5,663,874 | 9/1997 | Mader et al. . | |
| 5,684,683 | 11/1997 | Divan et al. . | |
| 5,757,625 | 5/1998 | Schoofs | 363/21 |

*Primary Examiner*—Shawn Riley
*Attorney, Agent, or Firm*—Gibbons, Del Deo, Dolan, Griffinger & Vecchione

[57] ABSTRACT

A current limiting circuit for a power switching transistor, the current limiting circuit incorporating a DC modulator to control the conducting/non-conducting state of the switching transistor, with an input signal generated and supplied to the modulator (and thus controlling a modulator DC bias output signal and therefore the conducting/non-conducting state of the switching transistor) comprised of two components: a first component which controls the modulator state based upon limiting maximum transistor current when a DC supply voltage is at a nominal design value, and a second component which dynamically adjusts the value of the modulator input signal when values of the DC supply voltage are other than the nominal design value.

33 Claims, 5 Drawing Sheets

CONTROL CIRCUIT ARRANGEMENT FOR LIMITING OUTPUT CURRENT IN POWER SWITCHING TRANSISTOR

FIELD OF THE INVENTION

This invention relates generally to power switching transistor control and, in particular, to current limiting circuits for power switching transistors.

BACKGROUND OF THE INVENTION

The output current of a power switching transistor is typically limited, via control circuitry, below a specified level. A representative use for semiconductor switching circuits is within DC-to-DC converter switching power supplies, which utilize a power switching transistor to produce the requisite DC current or voltage output The function of a DC-to-DC converter is to derive power from one source of DC voltage and deliver that power to a load at a regulated DC voltage (the regulated DC voltage may be the same as the originating source voltage or may be different than the originating source voltage, depending upon the design implementation required for a specific application). Various DC-to-DC converter circuit designs incorporating a power switching transistor are known in the prior art, including among others, those utilizing a pulse width modulator to control the conductive state of the power switching transistor. Additionally, various circuit design topologies are also known in the prior art, including, among others, forward, buck, boost, and flyback topology converters. Each individual topology and design utilizes some means of limiting the output current of the power switching transistor.

Figure 1:
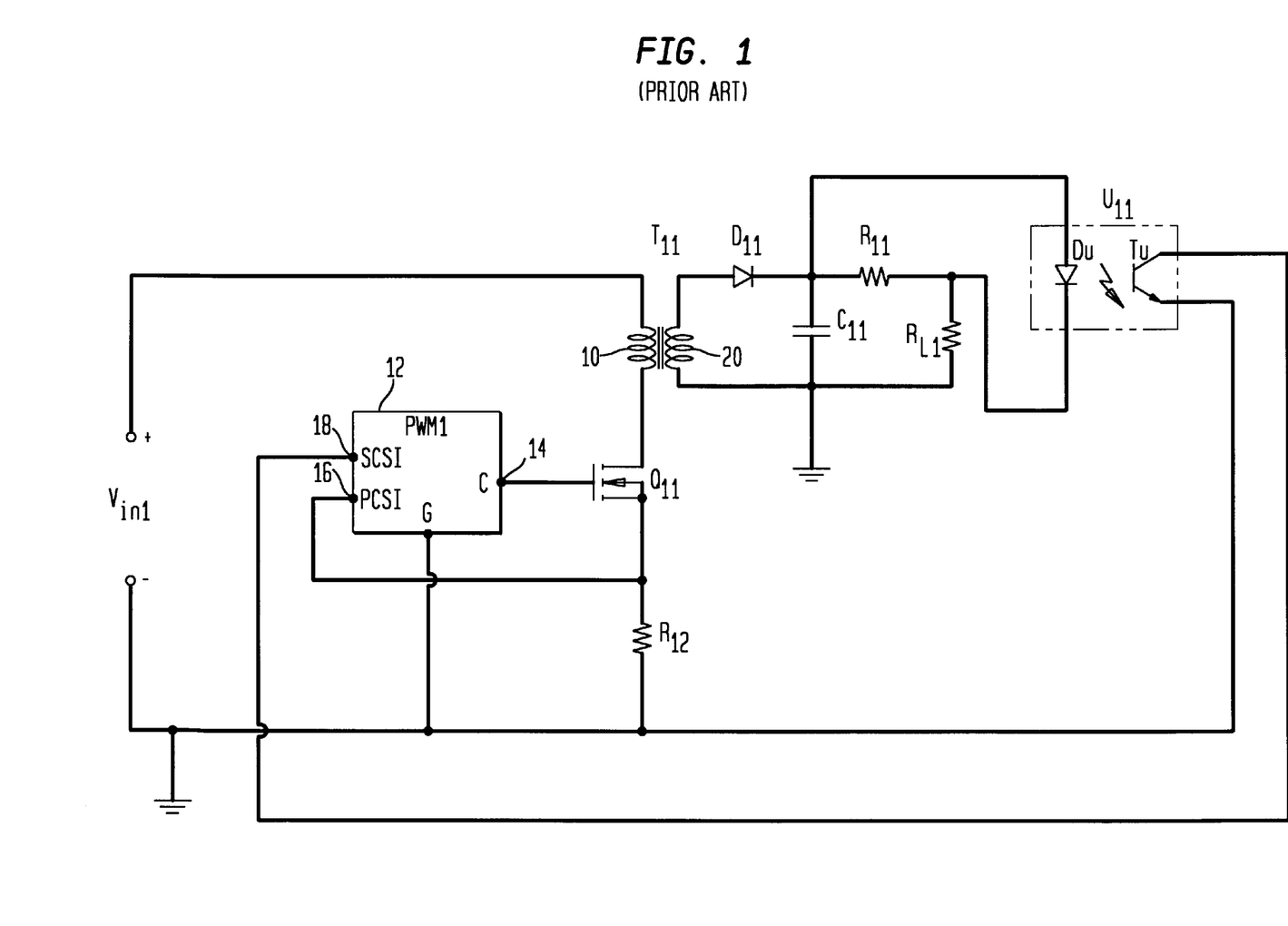
FIG. 1 is a simplified schematic representation of a prior art DC-to-DC converter circuit design incorporating a power switching transistor with output current limiting control and flyback topology.

A conventional DC-to-DC converter circuit design incorporating a power switching transistor with output current limiting control is shown in FIG. 1. The circuit as illustrated in FIG. 1 is arranged with flyback topology. The positive polarity of a DC input voltage, $V_{in1}$, is applied to one end of a primary winding of transformer $T_{11}$, the second end of the primary winding is coupled to the drain of field effect transistor (FET), $Q_{11}$, the source of $Q_{11}$ is coupled to one end of source resistor $R_{12}$, and the second end of $R_{12}$ is coupled to the negative polarity of $V_{in1}$, which is grounded. A pulse width modulator ($PWM_1$) 12 is provided to control whether $Q_{11}$ is on (conducting) or off (non-conducting). The $PWM_1$ control output 14 is coupled to the gate of $Q_{11}$ to provide the control function. A primary current sensing input (PCSI) 16 of the $PWM_1$ 12 is coupled to monitor voltage developed across source resistor $R_{12}$. A secondary current sensing input (SCSI) 18 is also available as an input to the $PWM_1$ 12.

The secondary winding 20 of transformer $T_{11}$ is coupled to provide regulated DC current through rectifyig diode $D_{11}$. The cathode of $D_{11}$ is coupled to one end of a secondary current sensing resistor, $R_{11}$, with the second end of $R_{11}$, coupled to a load resistance ($R_{L1}$). $R_{L1}$ is grounded to provide circuit continuity back to the secondary winding of $T_{11}$. Optical isolator ($U_{11}$) is comprised of a light-emitting diode $D_U$ and a transistor $T_U$. $D_U$ is coupled across (and parallel to) $R_{11}$. The collector of $T_U$ is coupled to provide a secondary cur-rent sensing signal to the SCSI 18 of the $PWM_1$ 12. The emitter of $T_U$ is grounded.

The DC-to-DC flyback converter of FIG. 1 operates as follows. When $PWM_1$ 12 provides a pulse width modulated control signal to the gate of $Q_{11}$, $Q_{11}$ turns on (begins conducting). The current path is from the positive polarity of $V_{in1}$, through the transformer primary 10 of $T_{11}$, through conducting transistor $Q_{11}$(from drain to source), through source resistor $R_{12}$, and back to the negative polarity of $V_{in1}$.

The voltage developed across $R_{12}$ is provided as the primary current sensing input (PCSI) 16 for $PWM_1$ 12. When PCSI 16 voltage reaches a predetermined level, $PWM_1$ 12 ceases to provide a pulse width modulated control signal to the gate of $Q_{11}$ (i.e., $PWM_1$ control signal returns to zero) and $Q_{11}$ceases to conduct (shuts off).

Transformer $T_{11}$ is provided for isolation protection between the dissimilar voltages of a primary circuit (incorporating the primary winding 10 of $T_{11}$) and a secondary circuit (incorporating the secondary winding 20 of $T_{11}$). The inductance associated with the primary winding 10 of $T_{11}$ causes the creation or enlargement of a magnetic field surrounding the primary winding whenever $Q_{11}$ is on. Conversely, the magnetic field surrounding the primary winding collapses whenever $Q_{11}$ is off. Due to mutual inductance between a transformer's primary and secondary windings, whenever the magnetic field of the primary winding 10 of $T_{11}$, is in a state of flux (that is, the associated magnetic field is enlarging or collapsing), a potential is induced within the secondary winding 20 of $T_{11}$. Increasing the frequency of transition between the conducting and non-conducting states of $Q_{11}$ causes the coupling between the primary winding 10 and secondary winding 20 of $T_{11}$ to increase, ultimately coupling more power to the secondary load circuit through the secondary winding 20.

Rectifying diode $D_{11}$ is provided to restrict current induced in the secondary winding 20 of $T_{11}$ unidirectionally through load resistance $R_{L1}$. The value of filter capacitor $C_{11}$ is selected to reduce power supply ripple to an acceptable and tolerable quantity. Current induced in the secondary winding 20 is directed through secondary current sensing resistor, $R_{11}$, before passing through load resistance $R_{L1}$.

The resistance value of $R_{12}$ and the predetermined PCSI 16 voltage which causes $Q_{11}$ to shut off are selected to limit current through transistor $Q_{11}$ and the associated primary current loop. However, $R_{12}$ and PCSI do not constrain the secondary circuit output power available at load resistance $R_{L1}$. Specifically, if the unregulated value of inlet voltage $V_{in1}$ is allowed to double, output power at $R_{L1}$ would quadruple (if no secondary circuit output power control circuitry were provided). Separate secondary circuit output power control circuitry is therefore implemented.

Secondary circuit current control is accomplished by providing a feedback signal corresponding to secondary circuit current to the $PWM_1$ at the secondary circuit sensing input (SCSI) 18 of the $PWM_1$. When isolation between dissimilar voltages of the primary circuit (incorporating the primary winding 10 of $T_{11}$) and the secondary circuit (incorporating the secondary winding 20 of $T_{11}$) is required, one method of providing isolation is through the use of an optical isolator $U_{11}$. An optical isolator is a semiconductor device comprised of an light-emitting diode $D_U$ and a transistor $T_U$ that conducts when it receives a photon emitted by the light-emitting diode. The light-emitting diode generates photons when the voltage applied across it is sufficient to forward bias the diode. Since $D_U$ is coupled across secondary current sensing resistor $R_{11}$, when current through $R_{11}$ develops a voltage sufficient to forward bias $D_U$, $T_U$ will begin conducting. Once $T_U$ is conducting (on), a secondary circuit current control signal is applied to the SCSI 18 of the $PWM_1$ 12. When the secondary circuit current control signal applied to SCSI 18 reaches a predetermined level, the $PWM_1$ 12 ceases to provide a pulse width modulated control signal to the gate of $Q_{11}$ (i.e., the $PWM_1$ control signal returns to zero) and $Q_{11}$ ceases to conduct (shuts off), thereby regulating the current/voltage available at $R_{L1}$. Therefore, despite fluctuations in the value of $V_{in1}$, outlet voltage at $R_{L1}$ is regulated through the combination of primary current sensing and secondary current sensing.

However, several disadvantages exist with conventionally designed switching circuits. First, circuit efficiency is degraded by incorporating secondary current sensing resistor $R_{11}$. This is so because all current available to the load resistance $R_{L1}$ must first pass through resistor $R_{L1}$, thus reducing circuit efficiency. Also, since $R_{11}$ is connected in series with $R_{L1}$, $R_{11}$ characteristically possesses significant power dissipation capabilities and is therefore a large resistor occupying additional circuit board space.

Additionally, in circuits requiring isolation between primary and secondary circuits, the use of an optical isolator (to provide feedback from the secondary winding circuit to the primary winding circuit) also requires additional circuit board space. Furthermore, utilizing a secondary current sensing resistor ($R_{11}$) and/or an optical isolator ($U_{11}$) requires additional production costs to manufacture the circuit.

SUMMARY OF THE INVENTION

The present invention is an improved current limuiting circuit for a power switching transistor, the current limiting circuit incorporating a DC modulator to control the conducting/non-conducting state of the switching transistor, with an input signal generated and supplied to the modulator (and thus controlling a modulator DC bias output signal and therefore the conducting/non-conducting state of the switching transistor) comprised of two components: a first component which controls the modulator state based upon limiting maximum transistor current when a DC supply voltage is at a nominal design value, and a second component which dynamically adjusts the value of the modulator input signal when values of the DC supply voltage are other than the nominal design value.

One embodiment of the present invention generates the input signal to the modulator (thus controlling the modulator DC bias output signal) by conveying a voltage drop across a signal developing resistor as the input signal to the modulator. The voltage drop is proportional to the total current through the signal developing resistor, the total current through the signal developing resistor attributable to two current loop sources (two current components). The components included in the first current loop are: a DC supply voltage, an inductive component (either an inductor or the primary of a transformer), the primary current carrying junction of the switching transistor, and the signal developing resistor. The components included in the second current loop are the DC supply voltage, a compensating resistor, and the signal developing resistor. A description of the circuit's power limiting feature with an increasing input DC voltage is as follows: as the DC supply voltage increases, the voltage developed across the signal developing resistor increases due to the increased current through the current loop comprised of the signal developing resistor and the compensation resistor. An increase in the voltage developed across the signal developing resistor is supplied as an input to the DC modulator which reduces the duty cycle of the DC bias output signal (and therefore the duty cycle of the switching transistor as well) in response. Therefore, the switching transistor supplies less current through the inductive component at DC supply voltages greater than nominal design (and conversely, the switching transistor supplies greater current through the inductive component at DC supply voltages less than nominal design), keeping the power available at the inductive component essentially constant while varying DC supply voltage, and concomitantly, limiting available output power below the rated capacity for the switching transistor.

Advantageously, when incorporated within a DC-to-DC converter, the present invention maintains an output power limit for the switching transistor for varying values of the DC supply voltage, even under varying values of current consumption at the load resistance. Thus circuit design of the present invention may incorporate components having a reduced power rating when compared to similar components within prior art circuits.

Additionally, prior art DC-to-DC converters having a transformer as the inductive component, and requiring primary-to-secondary circuit isolation, utilize an optical isolator and secondary circuit current sensing resistor to compensate for variations in the DC supply voltage (as described in the background of the invention), which requires additional board space for those components. The present invention does not require the use of an optical isolator or a secondary current sensing resistor, since secondary-to-primary circuit feedback is not required to compensate for variations in the DC supply voltage. The present invention accomplishes primary and secondary current and power control functions wholly within circuitry associated with the primary winding of the transformer. Eliminating the additional components required for current control in prior art implementations also provides the additional benefit of reduced production costs to manufacture the circuit.

BRIEF DESCRIPTION OF THE DRAWINGS

A more complete understanding of the present invention may be obtained from consideration of the following description in conjunction with the drawings in which.

DETAILED DESCRIPTION

Figure 2:
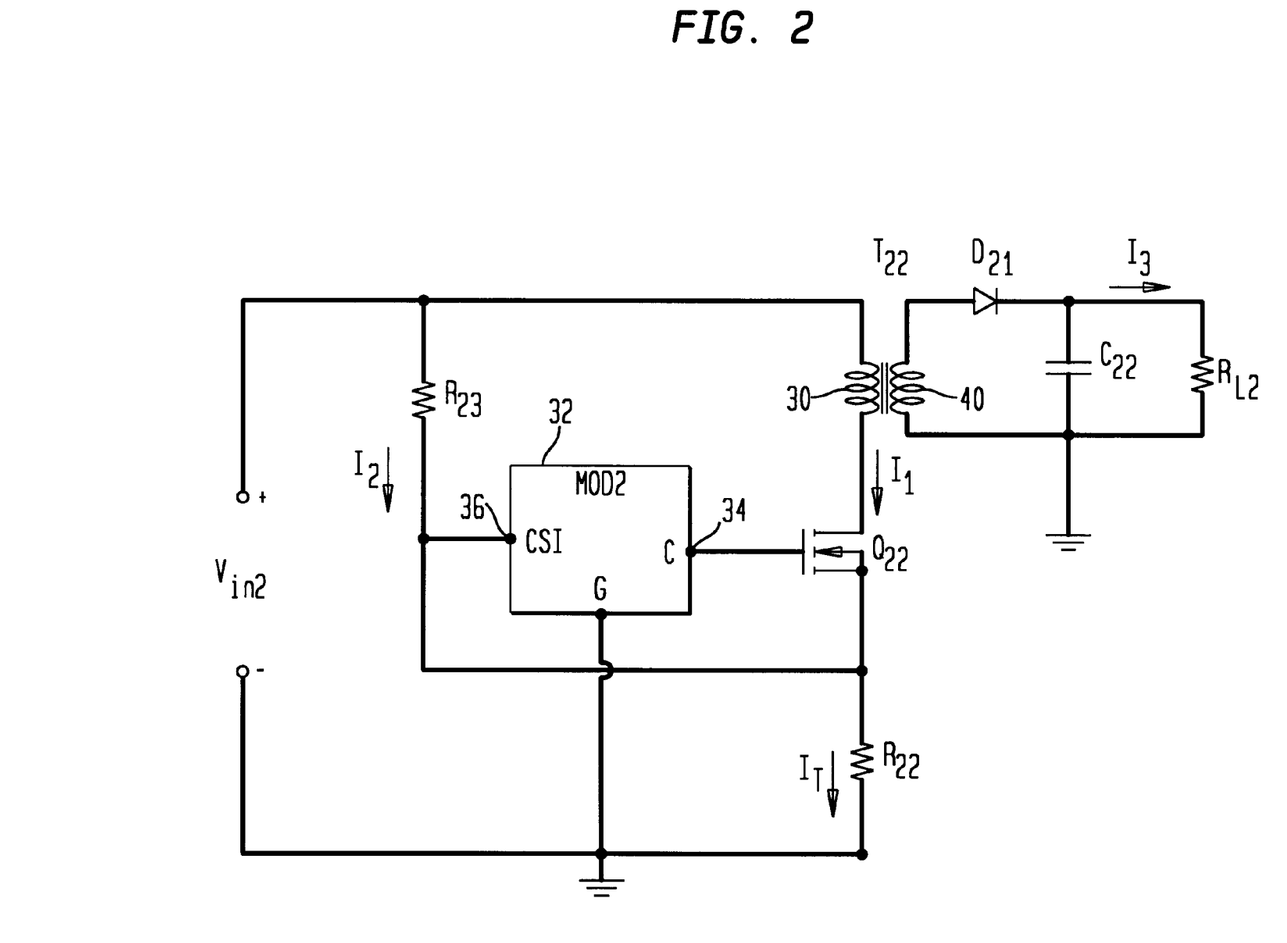
FIG. 2 is a simplified schematic representation of an exemplary embodiment of a DC-to-DC converter circuit design incorporating a power FET switching transistor with output voltage and current control accomplished by sensing only primary-side circuit parameters, in accordance with the present invention.

FIG. 2 is a simplified schematic representation of an exemplary embodiment of a DC-to-DC converter circuit design incorporating a power FET switching transistor with output voltage and current control accomplished by sensing only primary-side circuit parameters, in accordance with the present invention. The positive polarity of a DC input voltage, $V_{in2}$, is applied to one end of a primary winding of transformer $T_{22}$, the second end of the primary winding is coupled to the drain of field effect transistor (FET), $Q_{22}$, the source of $Q_{22}$ is coupled to one end of source resistor $R_{22}$, and the second end of $R_{22}$ is coupled to the negative polarity of $V_{in2}$, which is grounded. A DC modulator ($MOD_2$) 32 is provided to control whether $Q_{22}$ is on (conducting) or off (non-conducting). The DC modulator 32 chosen may be implemented utilizing any number of well known DC modulation techniques, including but not limited to, pulse width modulation, frequency modulation, and hybrid pulse width and frequency modulation schemes. Exemplary DC modulation waveforms are subsequently illustrated and described in conjunction with FIG. 5. $MOD_2$ control output 34 is coupled to the gate (switching control port) of $Q_{22}$ to provide the control function. A current sensing input (CSI) 36 of $MOD_2$ 32 is coupled to monitor voltage developed across source resistor $R_{22}$. A compensating resistor, $R_{23}$ is provided, coupled on one end to the positive polarity of $V_{in2}$ and on the second end to the current sensing input (CSI) 36 of $MOD_2$ 32.

The secondary winding 40 of transformer $T_{22}$ is coupled to provide regulated DC current through rectifyig diode $D_{21}$. The cathode of $D_{21}$ is coupled to one end of a load resistance ($R_{L2}$). $R_{L2}$ is grounded to provide circuit continuity back to the secondary winding 40 of $T_{22}$. Advantageously, the optical isolator ($U_{11}$) and the secondary current sensing resistor ($R_{11}$) associated with prior art implementations (as illustrated and described in conjunction with FIG. 1) are not required for current limiting control in the present invention (due to incorporation of compensating resistor, $R_{23}$). A filter capacitor, $C_{22}$, is provided and coupled in parallel with load resistance $R_{L2}$.

The DC-to-DC converter, and incorporated current limiting circuit for power switching transistor $Q_{22}$, of FIG. 2 operates as follows. When $MOD_2$ 32 provides a modulated DC control signal to the gate of $Q_{22}$, $Q_{22}$ turns on (begins conducting). The current path is from the positive polarity of $V_{in2}$, through the primary winding 30 of $T_{22}$, through conducting transistor $Q_{22}$ (from drain to source), through source resistor $R_{22}$, and back to the negative polarity of $V_{in2}$. The voltage developed across $R_{22}$ is provided as the current sensing input (CSI) 36 for $MOD_2$ 32. When the CSI 36 voltage reaches a predetermined level, $MOD_2$ 32 ceases to provide a modulated DC control signal to the gate of $Q_{22}$ (i.e., $MOD_2$ control signal returns to a zero or "null" value) and $Q_{22}$ ceases to conduct (shuts off). Therefore, $R_{22}$ provides a peak current limit for $Q_{22}$ at a nominal design voltage.

Transformer $T_{22}$ is provided for isolation protection between the dissimilar voltages of a primary circuit (incorporating the primary winding 30 of $T_{22}$) and a secondary circuit (incorporating the secondary winding 40 of $T_{22}$). The inductance associated with the primary winding 30 of $T_{22}$ causes the creation or enlargement of a magnetic field surrounding the primary winding whenever $Q_{22}$ is on. Conversely, the magnetic field surrounding the primary winding collapses whenever $Q_{22}$ is off. Due to mutual inductance between a transformer's primary and secondary windings, whenever the magnetic field of the primary winding 30 of $T_{22}$ is in a state of flux (that is, the associated magnetic field is enlarging or collapsing), a potential is induced within the secondary winding 40 of $T_{22}$. Increasing the frequency of transition between the conducting and non-conducting states of $Q_{22}$ in the embodiment of the present invention implemented using DC frequency modulation (or alternatively allowing a greater length of time for a magnetic field to more completely enlarge or collapse in the embodiment of the present invention implemented using pulse width modulation) causes the inductive coupling between the primary winding 30 and secondary winding 40 of $T_{22}$ to increase, ultimately coupling more power to the secondary load circuit through the secondary winding 40.

Rectifying diode $D_{22}$ is provided to restrict current induced in the secondary winding 40 of $T_{22}$ unidirectionally through load resistance $R_{L2}$. The value of filter capacitor $C_{22}$ is selected to reduce power supply ripple to an acceptable and tolerable quantity. It should be noted that secondary current sensing resistor $R_{11}$ and optical isolator $U_{11}$ (both associated with prior art FIG. 1) have been eliminated. Their inclusion in prior art circuits provided secondary circuit feedback to limit secondary circuit current (and consequently primary circuit current) due to variations in the DC input voltage ($V_{in1}$). The flinction of limiting secondary circuit current (current through $R_{L2}$) and consequently primary circuit current (current through switching transistor $Q_{22}$) due to fluctuations in input voltage ($V_{in2}$) is performned by inclusion of compensating resistor $R_{23}$ within the design of the circuit associated with various embodiments of the present invention. In effect, variations in power switching trnistor current due to input voltage variations are monitored and controlled via a secondary to primary feedback mechanism in the prior art; whereas variations in power switching transistor ($Q_{22}$) current due to input voltage ($V_{in2}$) variations are monitored and controlled completely within circuitry associated with primary circuit parameters. That is, the voltage developed across source resistor $R_{22}$ provides an input signal to the CSI 36 of $MOD_2$ 32 to limit maximum current and power for the power switching transistor when $V_{in2}$ is at nominal design value, while the voltage developed across compensation resistor $R_{23}$ dynamically adjusts the input signal available to CSI 36 of $MOD_2$ 32 to limit maximum current and power for the power switching transistor when $V_{in2}$ varies from that nominal design value.

A description of the operation of the $Q_{22}$ current limiting circuit of FIG. 2 follows. The voltage present at the CSI 36 of $MOD_2$ 32 is equal to the voltage developed across source resistor $R_{22}$. The voltage across $R_{22}$ is equal to its value of resistance times the current $I_T$ through $R_{22}$. Current $I_T$, in accordance with the present invention, is comprised of two components; power switching transistor $Q_{22}$ current ($I_1$) and compensating current ($I_2$). When the voltage developed across $R_{22}$ exceeds a predetermined CSI setpoint, $MOD_2$ 32 ceases to provide $Q_{22}$ with a control output 34 signal and $Q_{22}$ turns off. Current $I_T$ decreases, voltage across $R_{22}$ decreases and the voltage present at the CSI 36 of $MOD_2$ 32 drops below the predetermined CSI setpoint. Once voltage present at the CSI 36 of $MOD_2$ 32 is below the predetermined CSI setpoint, $MOD_2$ 32 is again enabled to provide a control output 34 signal and $Q_{22}$ once again is operable to conduct current $I_1$. The function of Resistor $R_{22}$ and associated current component $I_1$ is therefore properly described as a power switching transistor current limiting feature for transistor $Q_{22}$ when input voltage $V_{in2}$ is at its nominal design value.

When $V_{in2}$ varies from its nominally rated design value, $R_{22}$ alone does not provide the necessary control to limit $Q_{22}$ current ($I_1$) below the current carrying limit of the transistor and does not limit output power at load resistance $R_{L2}$. For example, assume for purposes of circuit analysis that the value of compensation resistor $R_{23}$ is infinite (such that there exists no current component $I_2$). If the unregulated voltage value of $V_{in1}$ increases, the maximum current available at $R_{L2}$, ($I_3$ in the secondary winding 40 circuit) also increases. This is because the power (current times voltage) available for coupling across the primary winding 30 of $T_{22}$ is greater (despite limiting current via the $R_{22}$ developed voltage applied at the CSI 36 of $MOD_2$ 32) because voltage across the primary winding 30 is greater than its value when $V_{in2}$ is at its nominal design voltage.

Advantageously, however, the value of $R_{23}$ is not infinite. When considering the effect of a finite value of compensation resistor $R_{23}$, the following circuit analysis applies. As $V_{in1}$ increases, the voltage developed across $R_{22}$ (and therefore available at the CSI 36 of $MOD_2$ 32) increases due to the increased current $I_2$ (which is a component of current $I_T$). An increase in the voltage at the CSI 36 of $MOD_2$ 32 causes $MOD_2$ 32 to cease providing $Q_{22}$ with a control output 34 signal and $Q_{22}$ turns off. Increasing the voltage at the CSI 36 (increasing the DC bias signal through the use of $R_{23}$) therefore stops $Q_{22}$ from conducting at a transistor current ($I_1$) less than value of $I_1$ which would turn off $Q_{22}$ at the $V_{in2}$ nominal design voltage. By decreasing the value of $I_1$ required to shut off the power switching transistor for increased values of $V_{in2}$, the power coupled through the primary winding 30 to the secondary winding 40 of $T_{22}$ is kept essentially constant. Therefore, the maximum current available at $R_{L2}$ ($I_3$) is essentially a constant. By choosing appropriate resistance values for $R_{22}$ and $R_{23}$, $I_3$ may be limited to any desired value. The limiting value for $I_3$ is regulated even when exposed to large variations in the value of input voltage $V_{in2}$.

Figure 3:
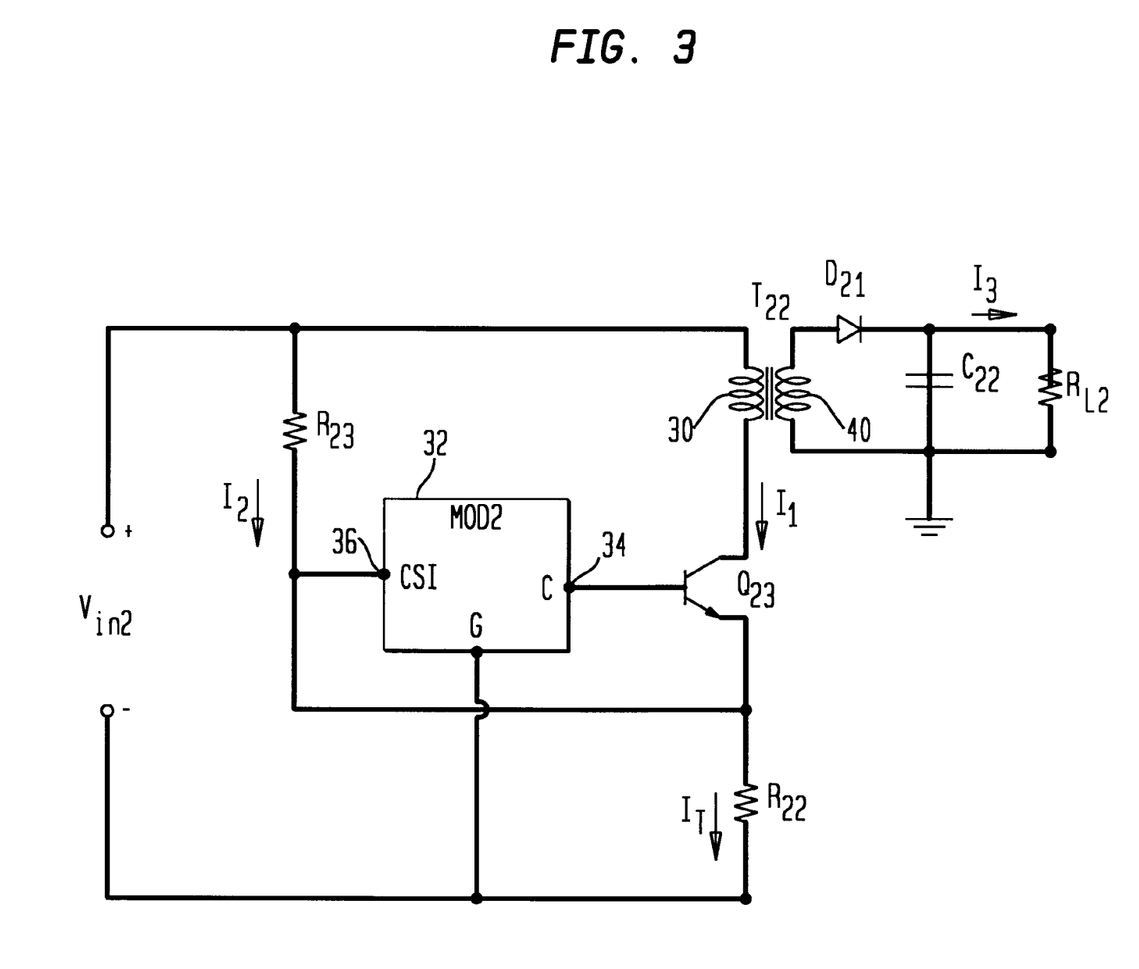
FIG. 3 is a simplified schematic representation of an exemplary embodiment of a DC-to-DC converter circuit design incorporating a power bipolar switching transistor with output voltage and current control accomplished by sensing only primary-side circuit parameters, in accordance with the present invention.

Advantageously, the present invention maintains an output power limit under varying values for $V_{in2}$ and under varying values of output current consumption ($I_3$). With prior art control circuits, the output power available increases as $V_{in1}$ increases. Thus, the circuit design of the present invention may include circuit components having a reduced power handling rating, when compared to those of prior art control circuits FIG. 3 is a simplified schematic representation of an exemplary embodiment of a DC-to-DC converter circuit incorporating a power bipolar switching transistor with output voltage and current control accomplished by sensing only primary-side circuit parameters, in accordance with the present invention. Circuit construction and analysis is the same as the embodiment described in conjunction with FIG. 2 with the exception that a bipolar transistor, $Q_{23}$, is utilized as the power switching device in lieu of an FET ($Q_{22}$). Other suitable transistors and semiconductor switching devices may also be incorporated into yet other embodiments of the present invention, as would be apparent to those skilled in the art.

Figure 4:
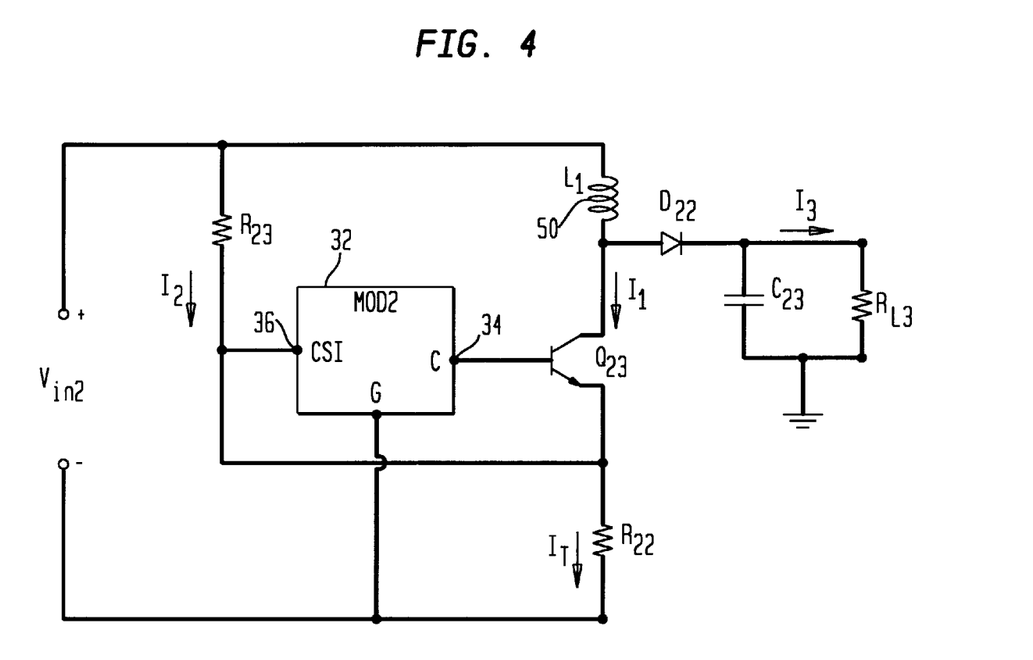
FIG. 4 is a simplified schematic representation of an exemplary embodiment of a DC-to-DC converter circuit design incorporating a power bipolar switching trasistor with direct coupling to the output load circuit, in accordance with the present invention.

FIG. 4 is a simplified schematic representation of an exemplary embodiment of a DC-to-DC converter circuit incorporating a power bipolar switching transistor with direct coupling to the output load circuit (in lieu of using a coupling transformer) in accordance with the present invention. Circuit construction and analysis is the same as the embodiment described in conjunction with FIG. 3 with the exception that transformer $T_{22}$ is replaced with inductor $L_1$ 50 and the output load circuit, through which current $I_3$ is conveyed, is directly coupled to the power circuit. Such an implementation is desirable since the cost of providing a transformer is inherently greater than the cost of simply utilizing an inductor, and is appropriate as an implementation whenever primary to secondary isolation is not required.

FIG. 5 is a graph illustrating various embodiments of exemplary DC modulating scheme signals in accordance with the present invention, including: pulse-width-modulation (PWM), frequency-modulation (FM), and dual modulation (PW/F/M) signals. The DC modulated waveforms of FIG. 5 are exemplary outputs from the control output 34 of $MOD_2$, thus providing DC bias control signals to sequentially turn a switching transistor on and off as necessary to control output current and power, as is well known in the art. Each respective DC bias control signal is represented as having a set value 60 and a null value 62. The switching transistor of the present invention, as previously described, is forward biased and conducts when the value of the modulator control output 34 is set and is reversed biased and ceases conducting when the value of the modulator control output 34 is null. However, in alternative embodiments of the present invention, the switching transistor may be controlled from the modulator control output 34 by applying negative pulse values and null values, or by applying negative pulse values and positive pulse values, the selection of the modulation scheme utilized to be compatible with the specific semiconductor device utilized, as would be apparent to those skilled in the art.

Figure 5A:
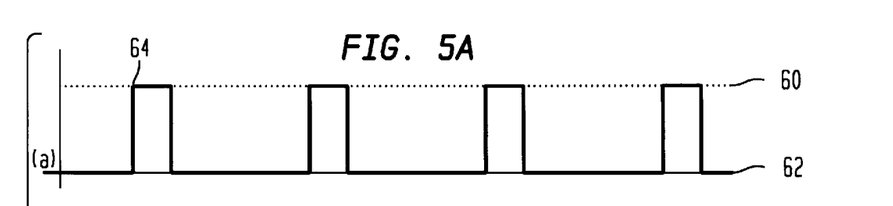
FIG. 5 is a graph illustrating exemplary embodiments of DC modulating scheme signals in accordance with the present invention, including: pulse-width-modulation (PWM), frequency-modulation (FM), and dual modulation (PW/F/M) signals.
Figure 5B:
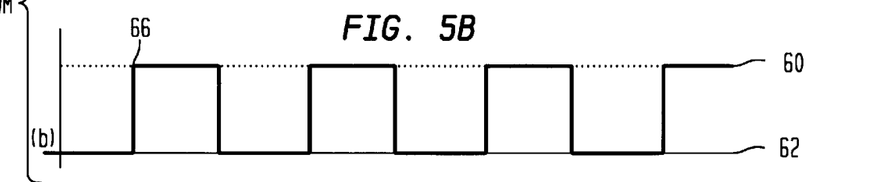

FIGS. 5a and 5b are illustrative DC bias control signals of an embodiment of the present invention utilizing a PWM as a DC modulator. The DC bias control signal of FIG. 5a is representative of a switching transistor which is supplying a light current load to $R_{L2}$, and therefore maintaining a light duty cycle when compared to the duty cycle of the DC bias control signal of FIG. 5b. Note that the leading edges 64,66 of DC pulses occur consistently and periodically whether the switching transistor is maintaining a light duty cycle (64) or a heavy duty cycle (66). However, the duration of each DC pulse is greater for a switching transistor maintaining a heavy duty cycle when compared to the duration of each DC pulse for a switching transistor maintaining a light duty cycle.

Figure 5C:
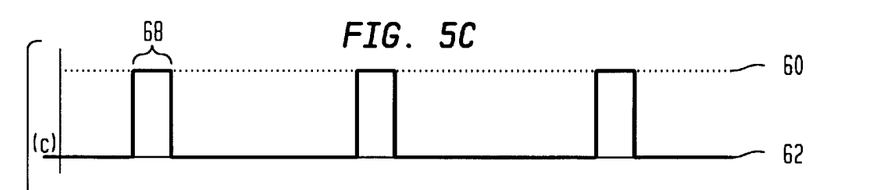
Figure 5D:
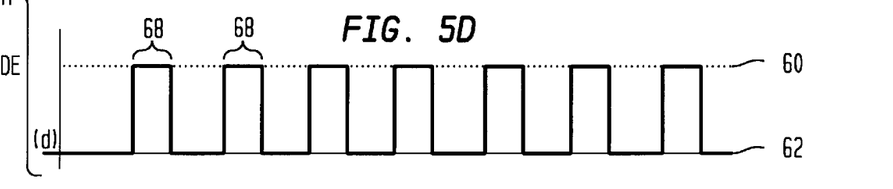

FIGS. 5c and 5d are illustrative DC bias control signals of an embodiment of the present invention utilizing a FM as a DC modulator. The DC bias control signal of FIG. 5c is representative of a switching transistor which is supplying a light current load to $R_{L2}$, and therefore maintaining a light duty cycle when compared to the duty cycle of the DC bias control signal of FIG. 5d. Note that the duration 68 of each DC pulse is equal whether the switching transistor is maintaining a light duty cycle or a heavy duty cycle. However, the frequency of occurrence of DC pulses is greater for a switching transistor maintaining a heavy duty cycle as when compared to the frequency of occurrence of DC pulses for a switching transistor maintaining a light duty cycle.

Figure 5E:
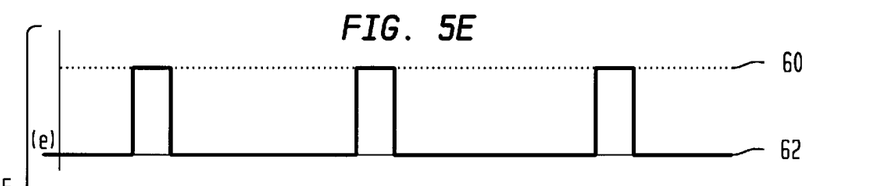
Figure 5F:
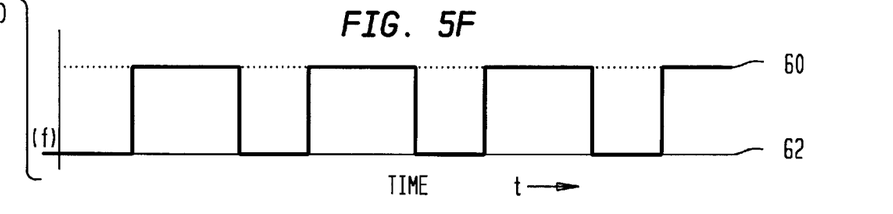

FIGS. 5e and 5f are illustrative DC bias control signals of an embodiment of the present invention utilg a PW/F/M as a DC modulator. The DC bias control signal of FIG. 5e is representative of a switching transistor which is supplying a light current load to $R_{L2}$, and therefore maintaining a light duty cycle when compared to the duty cycle of the DC bias control signal of FIG. 5f. Note that neither the duration nor the frequency of occurrence of the DC pulses are fixed when utilizing a PW/F/M as a modulator. That is, both the frequency of occurrence and the duration of DC pulses are variable in a PW/F/M implementation.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claim is reserved.

What is claimed is:

1. An apparatus for limiting maximum current in a power switching circuit, said apparatus comprising:

an inductive component;

a semiconductor device having a primary current carrying junction and a device switching control port, wherein said primary current carrying junction and said inductive component are coupled in series across an input DC power source having an input voltage value;

a DC pulse modulator having a current sensing input terminal and control output terminal, said DC pulse modulator operable to produce a DC bias output signal at said control output terminal, said control output terminal coupled to said device switching control port for controlling conduction through said primary current carrying junction;

means for producing a first current sensing signal value, said first current sensing signal value proportional to current through said primary current carrying junction and limited to a predetermined maximum peak current when said input voltage is a nominal design value; and means for producing a second current sensing signal value, said second current sensing signal value dynamically variable and representative of concomitant variations in said input voltage value and limited to a predetermined maximum peak current when said input voltage is other than said nominal design value, wherein said first and second current sensing signal values are concurrently applied to said current sensing input terminal to control said DC bias output signal, said DC bias output signal controlling conduction through said primary current carrying junction, said second current sensing signal value compensating for variations in said input voltage value.

2. The apparatus in accordance with claim 1 wherein said means for producing said first current sensing signal value is implemented utilizing a first series connected current loop; said first series connected current loop having a first current; said first series connected current loop comprising said input DC power source, said inductive component, said primary current carying junction, and a signal developing resistor; said first current sensing signal value equal to a first component of a voltage drop across said signal developing resistor; said first component of said voltage drop across said signal developing resistor being attributable to said first current.

3. The apparatus in accordance with claim 2 wherein said means for producing said second current sensing signal value is implemented utilizing a second series connected current loop; said second series connected current loop having a second current; said second series connected current loop comprising said input DC power source, a compensation resistor, and said signal developing resistor; said second current sensing signal value equal to a second component of a voltage drop across said signal developing resistor; said second component of said voltage drop across said signal developing resistor being attributable to said second current.

4. The apparatus in accordance with claim 1 wherein said inductive component is an inductor.

5. The apparatus in accordance with claim 1 wherein said inductive component is a primary winding of a transformer.

6. The apparatus in accordance with claim 1 wherein said semiconductor device is a FET transistor, said primary current carrying junction being a source-drain junction, said device switching control port being a gate.

7. The apparatus in accordance with claim 1 wherein said semiconductor device is a bipolar transistor, said primary current carrying junction being an emitter-collector junction, said device switching control port being a base.

8. The apparatus in accordance with claim 1 wherein said DC pulse modulator is a DC pulse width modulator.

9. The apparatus in accordance with claim 1 wherein said DC pulse modulator is a DC frequency modulator.

10. The apparatus in accordance with claim 1 wherein said DC pulse modulator is a DC dual mode modulator, said DC dual mode modulator operable for pulse width modulation and frequency modulation.

11. In a DC-to-DC power converter, an apparatus for limiting maximum current in a power switching transistor circuit having an input DC power source, said input DC power source having an input voltage value, said apparatus comprising:

an inductive coil;

a transistor having a primary current carrying junction and a device switching control port;

a DC pulse modulator having a current sensing input terminal and control output terminal, said DC pulse modulator operable to produce a DC bias output signal at said control output terminal, said control output terminal coupled to said device switching control port for controlling conduction through said primary current carrying junction;

a signal developing resistor coupled within a first series connected current loop, said first series connected current loop comprising said input DC power source, said inductive coil, said primary current carrying junction, and said signal developing resistor; and a compensation resistor coupled within a second series connected current loop, said second series connected current loop comprising said input DC power source, said compensation resistor, and said signal developing resistor, wherein said DC bias output signal controls conduction through said primary current carrying junction in response to a current sensing input value at said current sensing input terminal; said current sensing input value generated by a voltage developed across said signal developing resistor and comprised of two component values, a first component value proportional to current generated within said first series connected current loop and a second component value proportional to current generated within said second series connected current loop; said first component value limited to a predetermined maximum peak current through said primary current carrying junction when said input voltage value is a nominal design value; said second component value dynamically regulating and adjusting said current sensing input value to and limited to a predetermined maximum peak current through said primary current carrying junction when said input voltage value is other than said nominal design value.

12. The apparatus in accordance with claim 11 wherein said inductive coil is an inductor.

13. The apparatus in accordance with claim 12 wherein said transistor is an FET, said primary current carrying junction being a source-drain junction, said device switching control port being a gate.

14. The apparatus in accordance with claim 12 wherein said transistor is a bipolar transistor, said primary current carrying junction being an emitter-collector junction, said device switching control port being a base.

15. The apparatus in accordance with claim 12 wherein said DC pulse modulator is a DC pulse width modulator.

16. The apparatus in accordance with claim 12 wherein said DC pulse modulator is a DC frequency modulator.

17. The apparatus in accordance with claim 12 wherein said DC pulse modulator is a DC dual mode modulator, said DC dual mode modulator operable for pulse width modulation and frequency modulation.

18. The apparatus in accordance with claim 11 wherein said inductive coil is a primary winding of a transformer.

19. The apparatus in accordance with claim 18 wherein said transistor is an FET, said primary current carrying junction being a source-drain junction, said device switching control port being a gate.

20. The apparatus in accordance with claim 18 wherein said transistor is a bipolar transistor, said primary current carrying junction being an emitter-collector junction, said device switching control port being a base.

21. The apparatus in accordance with claim 18 wherein said DC pulse modulator is a DC pulse width modulator.

22. The apparatus in accordance with claim 18 wherein said DC pulse modulator is a DC frequency modulator.

23. The apparatus in accordance with claim 18 wherein said DC pulse modulator is a DC dual mode modulator, said DC dual mode modulator operable for pulse width modulation and frequency modulation.

24. In a switching transistor control circuit comprised of a power switching transistor and a DC pulse modulator, said DC pulse modulator controlling conduction of said power switching transistor, and incorporated within a DC-to-DC power converter having a DC supply voltage value and a regulated DC outlet current, a method for limiting maximum power through a primary current carrying junction of said power switching transistor, said method operable when varying said DC supply voltage value and when varying a load resistance value coupled to an output of said DC-to-DC power converter, said method comprising the steps of:

generating a first signal component proportional in value to current through said primary current carrying junction;

generating a second signal component proportional in value to a magnitude of deviation between said DC supply voltage value and a DC supply voltage nominal design value;

summing said first signal component and said second signal component to form a current sensing input (CSI) value;

applying said CSI value to an input of said DC pulse modulator, said DC pulse modulator producing a pulsed DC bias output signal proportional to said CSI value, said pulsed DC bias output signal dynamically controlling and limiting maximum power through said primary current carrying junction of said power switching transistor.

25. The method in accordance with claim 24 wherein said step of generating said first signal component is implemented utilizing a first series connected current loop; said first series connected current loop having a first current; said first series connected current loop comprising a DC input power source, an inductive coil, said primary current carrying junction, and a signal developing resistor; said first signal component equal to a first component of a voltage drop across said signal developing resistor; said first component of said voltage drop across said signal developing resistor proportional to said first current.

26. The method in accordance with claim 25 wherein said step of generating said second signal component is implemented utilizing a second series connected current loop; said second series connected current loop having a second current; said second series connected current loop comprising said DC input power source, a compensation resistor, and said signal developing resistor; said second signal component equal to a second component of a voltage drop across said signal developing resistor; said second component of said voltage drop across said signal developing resistor proportional to said second current.

27. The method in accordance with claim 25 wherein said inductive coil is an inductor.

28. The method in accordance with claim 25 wherein said inductive coil is a primary winding of a transformer.

29. The method in accordance with claim 24 wherein said power switching transistor is an FET.

30. The method in accordance with claim 24 wherein said power switching transistor is a bipolar transistor.

31. The method in accordance with claim 24 wherein said DC pulse modulator is a DC pulse width modulator.

32. The method in accordance with claim 24 wherein said DC pulse modulator is a DC pulse frequency modulator.

33. The method in accordance with claim 24 wherein said DC pulse modulator is a DC dual mode modulator, said DC dual mode modulator operable for pulse width modulation and pulse frequency modulation.

* * * * *